(12) United States Patent
Zhang et al.

(10) Patent No.: US 9,548,837 B2
(45) Date of Patent: Jan. 17, 2017

(54) METHOD AND APPARATUS FOR TRANSMITTING AND RECEIVING A DATA BLOCK IN A WIRELESS COMMUNICATION SYSTEM

(75) Inventors: Xiaobo Zhang, Shanghai (CN); Qi Zhou, Shanghai (CN); Ni Ma, Shanghai (CN); Ludovicus Marinus Gerardus Maria Tolhuizen, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 2240 days.

(21) Appl. No.: 12/280,998

(22) PCT Filed: Feb. 15, 2007

(86) PCT No.: PCT/IB2007/050494
§ 371 (c)(1),
(2), (4) Date: Aug. 28, 2008

(87) PCT Pub. No.: WO2007/099468
PCT Pub. Date: Sep. 7, 2007

(65) Prior Publication Data
US 2009/0067424 A1    Mar. 12, 2009

(30) Foreign Application Priority Data

Mar. 3, 2006  (CN) .......................... 2006 1 0059422

(51) Int. Cl.
*H04L 12/56* (2006.01)
*H04L 1/18* (2006.01)
(Continued)

(52) U.S. Cl.
CPC ........... *H04L 1/1819* (2013.01); *H04L 1/0057* (2013.01); *H04L 1/1607* (2013.01)

(58) Field of Classification Search
CPC ..... H04L 1/0057; H04L 1/1607; H04L 1/1819
(Continued)

(56) References Cited

U.S. PATENT DOCUMENTS 6,269,080 B1 * 7/2001 Kumar .......................... 370/236
7,096,400 B2 * 8/2006 Lim et al. ..................... 714/748
(Continued)

FOREIGN PATENT DOCUMENTS

GB        2368760 A      5/2002

OTHER PUBLICATIONS

Marc P. C. Fossorier: Soft-Decision Decoding of Linear Block Codes Based on Ordered Statistics, IEEE Transactions on Information Theory, vol. 41, No. 5, Sep. 1995, pp. 1375-1396.
(Continued)

*Primary Examiner* — Gbemileke Onamuti
(74) *Attorney, Agent, or Firm* — Larry Liberchuk

(57) ABSTRACT

A method for transmitting and receiving a source data block using hybrid automatic retransmission request protocol. At the transmitting side, the source data block that is not decoded correctly at the receiving side is divided into a plurality of data segments, each of which may be padded with known data to expand the data segments to be a predetermined lengthen. At the receiving side, when each of the received data packets includes a data segment and a redundancy information segment, decoding is performed based on the received data segment and redundancy information segment extracted from buffered data packets, with chances to restore the data segment that is not decoded correctly in previous decoding processing. The additional decoding chances improve the probability of correctly decoding the erroneous data segment.

17 Claims, 8 Drawing Sheets

(51) Int. Cl.
*H04L 1/00* (2006.01)
*H04L 1/16* (2006.01)

(58) Field of Classification Search
USPC .......................... 714/751, 748; 370/236, 464
See application file for complete search history.

(56) References Cited

U.S. PATENT DOCUMENTS

| | | | |
|---|---|---|---|
| 7,564,867 B2* | 7/2009 | Cheng et al. | 370/464 |
| 7,600,172 B2* | 10/2009 | Berens et al. | 714/751 |
| 2004/0153909 A1 | 8/2004 | Lim et al. | |
| 2005/0122898 A1 | 6/2005 | Jang et al. | |
| 2005/0149841 A1 | 7/2005 | Kyung et al. | |
| 2005/0149842 A1 | 7/2005 | Kyung et al. | |
| 2005/0149843 A1 | 7/2005 | Shen et al. | |

OTHER PUBLICATIONS

C. Mackay, et al: Near Shannon Limit Performance of Low-Density Parity-Check Codes, Electronics Letters, vol. 32, pp. 1645-1656.
Uwe Dammer, et al: A Data Puncturing IR-Scheme for Type-II Hybrid ARQ Protocols Using LDPC Codes, Global Telecommunications Conf., 2004, GLOBECOM.'04, IEEE Dallas TX, USA. Nov. 29-Dec. 3, 2004, pp. 3012-3016.
M. Miyagi, et al: Selective Repeat Type-II Hybrid FEC/ARQ Systems Using Concatenated Codes, Electronics and Commiunications in Japan, Part 1, vol. 76, No. 6, Jun. 1993, pp. 25-34.

* cited by examiner

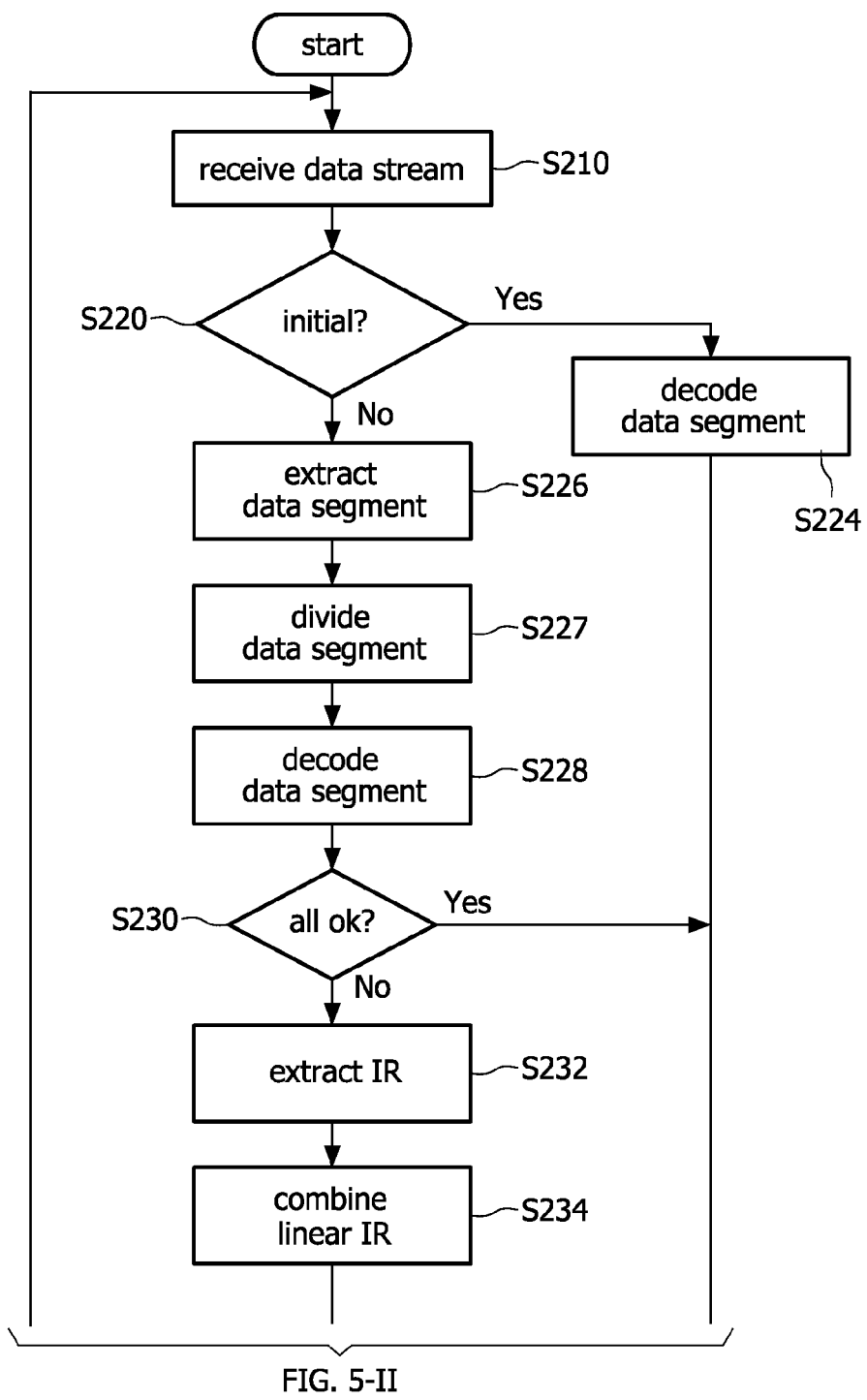

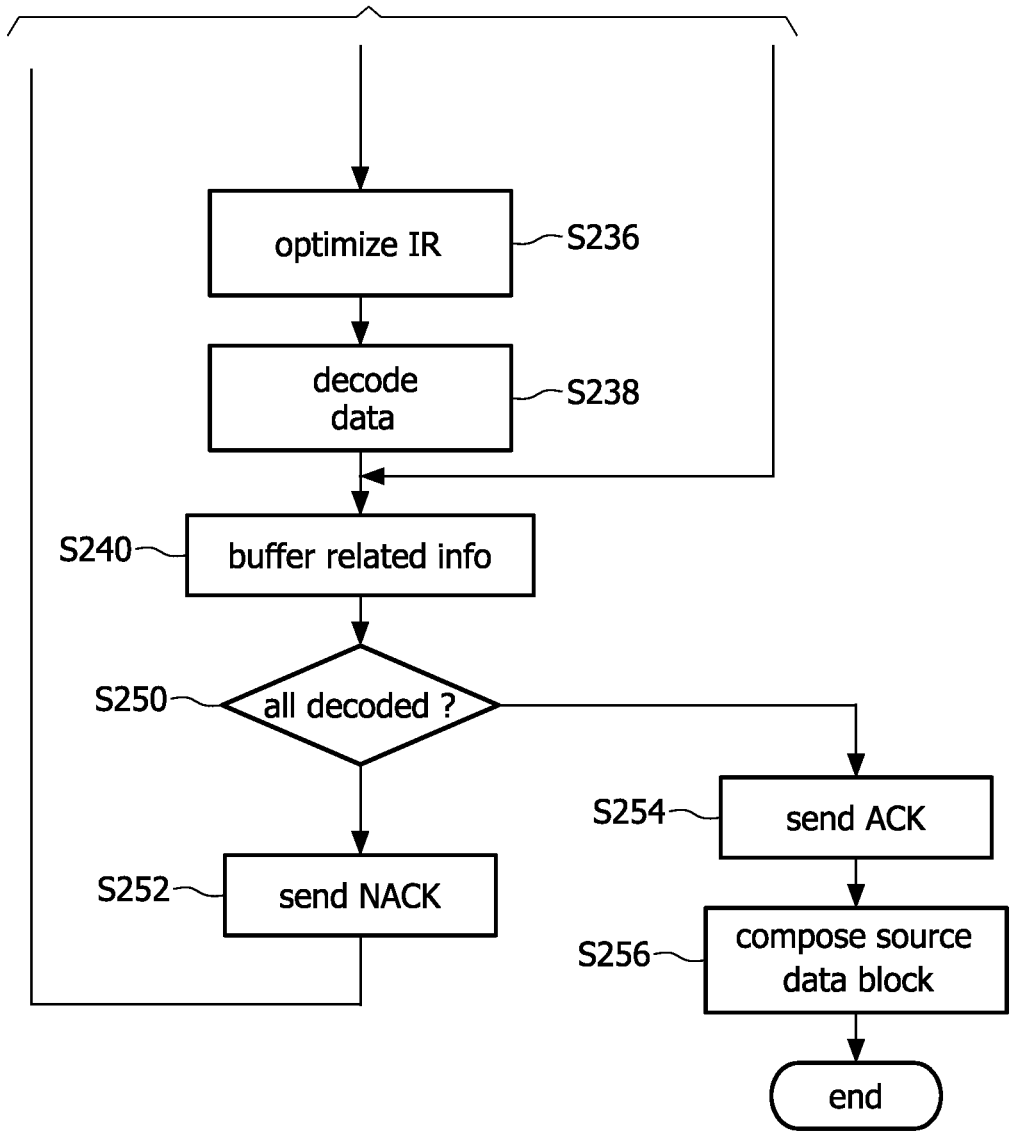
FIG. 5-II

METHOD AND APPARATUS FOR TRANSMITTING AND RECEIVING A DATA BLOCK IN A WIRELESS COMMUNICATION SYSTEM

FIELD OF THE INVENTION

The invention relates to wireless communications, particularly relates to a method and apparatus for transmitting data packets using hybrid ARQ (HARQ: Hybrid Automatic Retransmission reQuest) protocol in a wireless communication system.

BACKGROUND OF THE INVENTION

Hybrid ARQ protocols combines a forward-error-correction (FEC) with a retransmission mechanism to provide reliable communication over noisy channels. A packet is only retransmitted if the error-correcting code is not able to correctly decode the packet. To lower the average transmitted amount of redundancy information, type-II hybrid ARQ protocols have been introduced. For the initial transmission, only a small amount of parity information is transmitted with the actual source data. If decoding fails, additional parity information is transmitted incrementally (incremental redundancy, IR) to form lower rate codes. To this end rate compatible codes are often used to allow the construction of a high rate code from a low rate codes by puncturing parts of the parity information. Different error-correcting-codes like Reed-solomon codes, convolutional codes turbo product codes or low-density parity-check (LDPC) code can be used in this scheme.

A general approach to construct rate compatible LDPC codes is disclosed in "A Data Puncturing IR-scheme for Type-II Hybrid ARQ Protocols Using LDPC Codes" in IEEE Communications Society Globecom 2004, page 3012 to 3016, by Uwe Dammer etc. According to the disclosed scheme, incremental redundancy is created from punctured versions of the original data using the same encoder/decoder hardware. If the initial redundancy is not sufficient, only additional parity packets rather than entire packets must be retransmitted and parts of the initially received data can be gradually improved until successful decoding of the entire code is possible. In this way, the data puncturing LDPC obtains a better throughput comparing with other candidate rate compatible codes.

However, data puncturing suffers great performance loss and its adverse impact is more evident as the puncturing rate increases, and in the worst cases, the large percentage of punctured bits may paralyze the iterative soft decision decoder. And furthermore, as other typical transmission schemes using HARQ type-II, the use of rate compatible codes makes the decoding scheme more complicated. All these reduce system transmission performance and thus make the decoder does not work efficiently as originally expected.

Thus there is a need for providing a more efficient transmission scheme for use in a wireless communication system using hybrid ARQ protocol.

SUMMARY OF THE INVENTION

Amongst others it is an object of the invention to provide an efficient transmission scheme for use in a wireless communication system using hybrid ARQ protocol. The transmission scheme provided by the invention has same code rate and optimized encoding/decoding solution and thus effectively improves system transmission performance.

To this end, the invention provides a method of transmitting a source data block to a receiver in a wireless communication system using hybrid automatic retransmission request protocol. The method includes initial transmission phase and retransmission phase. In initial transmission phase, the method comprises steps of: dividing the source data block into a plurality of data segments; performing linear coding on each of the plurality of data segments respectively to generate a plurality of data packets, each of the plurality of data packets including the data segment used for encoding and a corresponding redundancy information segment for decoding in the receiver; and transmitting the plurality of data packets to a transmission channel. In retransmission phase, the method comprises steps of: receiving a feedback message from the receiver, the feedback message indicating which part of the source data block is not decoded correctly; dividing the indicated part of the source data block into a plurality of data segments according; padding known data into each of the plurality of data segments to expand the data segment to be predefined lengthen; performing linear coding on each of the plurality of data segments to generate a plurality of data packets, each of the plurality of data packets including a redundancy information segment for decoding the data segment in the receiver; and transmitting the plurality of data packets to a transmission channel. As in retransmission phase, only the data segment not decoded correctly is divided into multiple data segments and padded with known data to be a predetermined lengthen, the multiple encoders can respectively encode the multiple data segments with same code rate, and thus simplifies encoding and improves system performance.

The invention further provides a receiving method for restoring a source data block in a wireless communication system using hybrid automatic retransmission request protocol. The method includes two phases corresponding to initial transmission and retransmission. Corresponding to initial transmission, the method comprises steps of: receiving a plurality of data packets, each of the plurality of data packets including an data segment and a redundancy information segment; and performing channel decoding based on the data segment and redundancy information segment in each of the plurality of data packets to restore a source data segment. Corresponding to retransmission, the method comprises steps of: receiving a data stream from a transmission channel, the data stream including a plurality of data packets, each of the data packets including a redundancy information segment; extracting an data segment not decoded correctly from a buffered data segment; dividing the extracted data segment into a plurality of data segments; and performing channel decoding based on each of the plurality of data segments and corresponding redundancy information segment respectively to restore a plurality of source data segments.

In a preferred embodiment, when any one of the plurality of data segments is not decoded correctly during the phase corresponding to retransmission, the method further comprises following steps: composing the plurality of redundancy information segments to be a linear redundancy information segment; extracting an redundancy information segment from a buffered redundancy information segment corresponding to the extracted data segment; generating an optimized redundancy information segment based on the linear redundancy information segment and the extracted redundancy information segment; and performing channel decoding based on the optimized redundancy information segment and the extracted data segment to restore a source data segment. As the method can provide a second chance to perform decoding based on optimization of the redundancy information, it improves the probability of correctly decoding the erroneous data segment and thus improves transmission efficiency of the system.

In description of the invention here and hereafter, the redundancy information could be parity-check information or any other information that can be used for error-correction during decoding.

Another object of the invention is to provide an efficient apparatuses for data transmission for use in a wireless communication system using hybrid ARQ protocol. The data transmission apparatuses adopts encoding scheme that has same code rate and an optimized decoding and can improve transmission efficiently.

To this end the invention provides an apparatus for transmitting a source data block to a receiver in a wireless communication system using hybrid automatic retransmission request protocol, comprising: a receiving unit for receiving a feedback message from the receiver, the feedback message indicating which part of the source data block is not decoded correctly; a dividing unit for dividing the indicated part of the source data block into a plurality of data segments according; a padding unit for padding known data into each of the plurality of data segments to expand the data segment to be predefined lengthen; a plurality of encoders for performing linear coding on each of the plurality of data segments to generate a plurality of data packets, each of the plurality of data packets including a redundancy information segment for decoding the data segment in the receiver; and a transmitting unit for transmitting the plurality of data packets to a transmission channel. Furthermore, the dividing unit is further arranged for dividing the source data block into a plurality of data segments; the plurality of encoders are further arranged for performing linear coding on each of the plurality of data segments respectively to generate a plurality of data packets, each of the plurality of data packets including the data segment used for encoding and a corresponding redundancy information segment for decoding in the receiver; and the transmitting unit is further arranged for transmitting the plurality of data packets to a transmission channel.

The invention further provides a receiving apparatus for restoring a source data block in a wireless communication system using hybrid automatic retransmission request protocol, comprising: a receiving unit for receiving a data stream from a transmission channel, the data stream including a plurality of data packets, each of the data packets including a redundancy information segment; a first extracting unit for extracting an data segment not decoded correctly from a buffered data segment; a dividing unit for dividing the extracted data segment into a plurality of data segments; and a plurality of decoders for performing channel decoding based on each of the plurality of data segments and corresponding redundancy information segment respectively to restore a plurality of source data segments. And the receiving unit if further arranged for receiving a plurality of data packets, each of the plurality of data packets including a data segment and a redundancy information segment; the plurality of decoders is further arranged for performing channel decoding based on the data segment and redundancy information segment in each of the plurality of data packets to restore a source data segment.

As linear code and same code rate are used for encoding, the plurality of decoders in the receiving apparatus can adopt a same structure, and also work in same way during different decoding phases, and therefore greatly simplifies the implementation of decoders.

In a preferred embodiment, the apparatus further comprising: a second extracting unit for extracting an redundancy information segment from a buffered redundancy information segment corresponding to the data segment extracted by the first extracting unit; a processing unit for composing the plurality of redundancy information segments to be a linear redundancy information segment; and a generating unit for generating an optimized redundancy information segment based on the linear redundancy information segment and the extracted redundancy information segment. As the apparatus can provide a second chance to perform decoding based on optimization of the redundancy information, it improves the probability of correctly decoding the erroneous data segment and thus improves transmission efficiency of the system.

BRIEF DESCRIPTION OF THE FIGURES

The above and other objects and features of the present invention will become more apparent from the following detailed description considered in connection with the accompanying drawings in which:

FIG. 5 is a flowchart illustrating an embodiment of a receiving method in accordance with the invention;

In the figures, the same reference number represents the same, similar or corresponding feature or function.

DETAILED DESCRIPTION OF PREFERRED EMBODIMENTS

Figure 1:
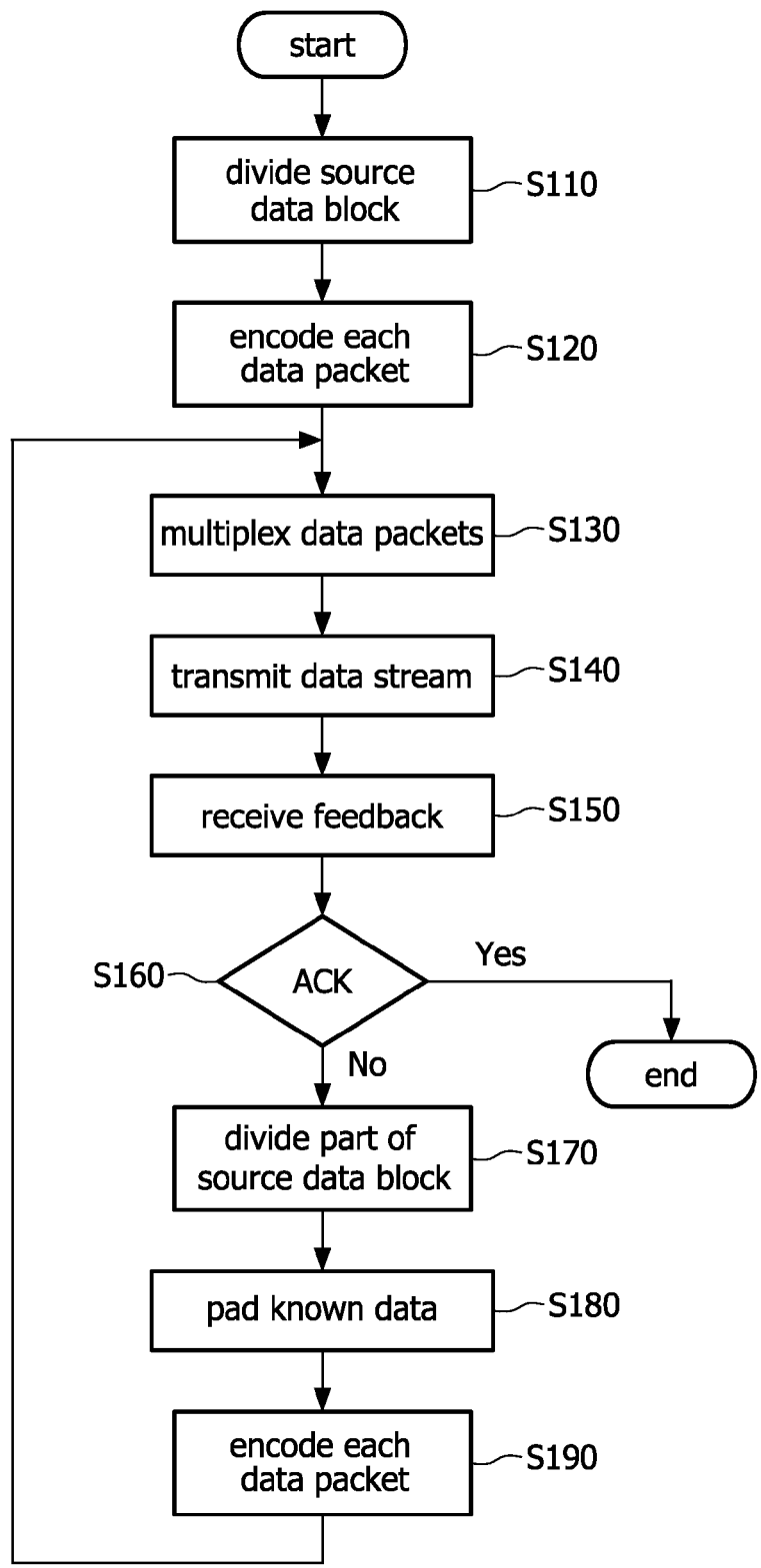
FIG. 1 is a flowchart illustrating an embodiment of a transmitting method in accordance with the invention.

FIG. 1 is a flowchart illustrating an embodiment of a transmitting method in accordance with the invention. FIG. 2 is a schematic data flow illustrating an embodiment of the encoding scheme in accordance with the invention. The transmitting method comprises initial transmission phase and retransmission phase. It becomes more apparent from the following detailed description considered in connection with FIG. 1 and FIG. 2.

The process of the method starts at the phase of initial transmission. In step S110, the source data block is divided into a plurality of data segments. It is assumed that, in this embodiment, the source data block S is divided into two data segments S(1,1) and S(1,2). In a preferred embodiment the two data segments S(1,1) and S(1,2) have same lengthen.

Figure 2A:
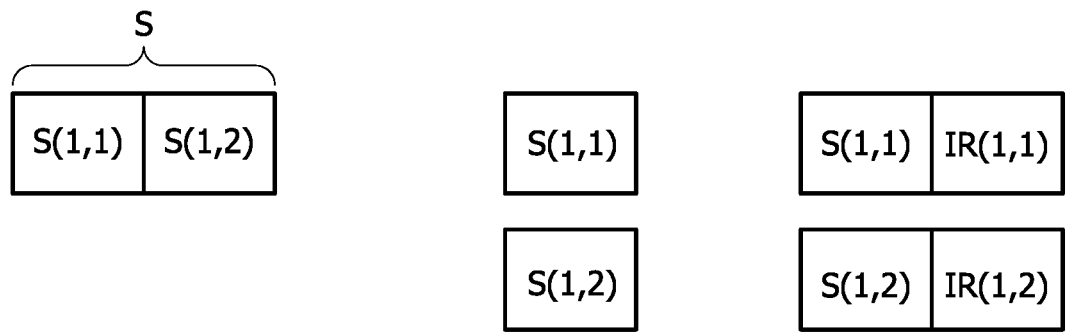
FIG. 2 is a schematic data flow illustrating an embodiment of the encoding scheme in accordance with the invention.

In step S120, each of the data segments, e.g., S(1,1) and S(1,2) are encoded respectively by using a linear block code to obtain two data packets for initial transmission. The first data packet includes the data segment S(1,1) and its corresponding parity-check information IR(1,1) and the second data packet includes the data segment S(1,2) and its corresponding parity-check information IR(1,2). The data-flow in step S110 and S120 is illustrated in FIG. 2(a).

In step S130, the two data packets are multiplexed into a data stream for initial transmission.

In step S140, the data stream is transmitted to a transmission channel.

In step S150, a feedback message from a corresponding receiver is received. The feedback message indicates as "acknowledged" when all data segments are decoded correctly at receiving side, otherwise, it indicates which part of the source data block is not decoded correctly at receiving side.

In step S160, a decision is made based on the content of the feedback message. If the feedback message indicates as "acknowledged", then the process ends without retransmission, otherwise, the process enters into the retransmission phase. In case that all data segments are not decoded correctly at receiving side, the retransmission scheme may refer to conventional methods using hybrid HARQ Type-II protocol that will be not described in detail here. The invention mainly focuses on the cases when only a part of the source data block is not decoded correctly at receiving side.

The phase of retransmission starts at step S170. It is reasonable to assume that S(1,2) is decoded correctly at receiving side but S(1,1) is not. So, the received feedback message will indicates the data segment S(1,1) as the part of source data block not decoded correctly.

In step S170, the data segment S(1,1) is further divided into two data segments: S(2,1) and S(2,2), wherein the data segment S(1,2) in shadow represents the part of source data block that has been decoded correctly at receiving side.

In step S180, the two data segments S(2,1) and S(2,2) are padded with known data, preferably zeros, and the data segment is expanded to be a predetermined lengthen. Preferably, the predetermined lengthen is the same with the lengthen of data segment S(1,1) and S(1,2) so as to simplify encoding.

Figure 2B:
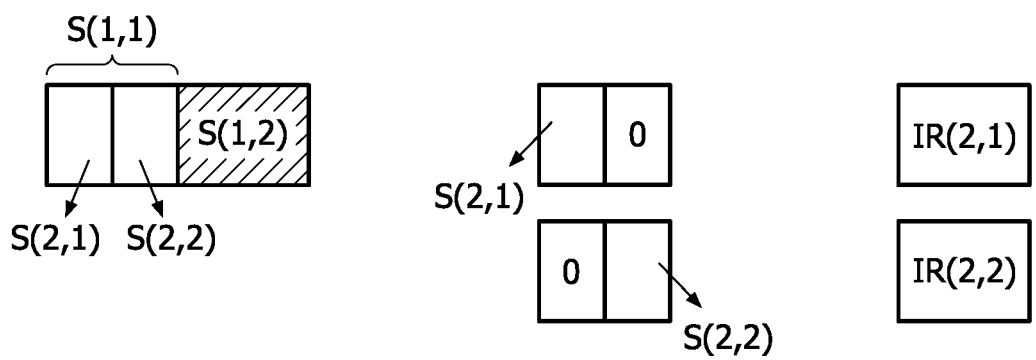

In step S190, the two new data segments S(2,1) and S(2,2) are encoded respectively to obtain two data packets. Each of the data packets includes a redundancy information segment, e.g., the parity-check information IR(2,1) and IR(2,2). The data-flow in step S170, S180 and S190 is illustrated in FIG. 2(b).

In a preferred embodiment, the encoding scheme, e.g., the linear code and code rate used for encoding in step S120 and S190 are same. The only difference of encoding between initial transmission phase and retransmission phase is the output data packet in the former includes both a data segment and a redundancy information segment while the latter includes only a redundancy information segment.

In another preferred embodiment, a low-density parity-check code (LDPC) as linear block code is used for channel coding in step S120 and S190. According to D. J. C. MacKay and R. M. Neal "Near Shannon limit performance of low-density parity-check codes," *Electron. Lett.*, vol. 32, pp. 1645-1646, August 1996, LDPC codes perform nearly as well as turbo codes, which is widely applied in wireless communication system, and are at least an order of magnitude simpler than the turbo decoding algorithm. LDPC codes also have other distinct advantages over turbo codes, for example, belief-propagation decoding for LDPC codes can be fully parallelizable and thus can potentially speed up decoding and improve system throughput.

As the encoding scheme in each encoding step is same, the linear sum of parity-check information segments respectively generated from S(2,1) and S(2,2) in step S190 is equivalent to parity-check information segment IR(1,1) generated from S(1,1) in step S120.

After encoding, the process goes to step S130. In step S130, the two parity-check information segments IR(2,1) and IR(2,2) are multiplexed into a data stream and the data stream is transmitted to a transmission channel in step S140.

The process continues with step S1150 for receiving a further feedback message from the receiving side and step S160 for decision-making based on the received feedback message. If both of the two segments S(2,1) and S(2,2) are decoded correctly, the a feedback message indicating "acknowledged" will be received and the process goes to the end.

If one of the two data segments S(2,1) and S(2,2) could not be decoded correctly with help of the incremental redundancy information segments IR(2,1) and IR(2,2), then feedback message indicating the data segment not decoded correctly will be received and the process goes to step S170.

Figure 2C:
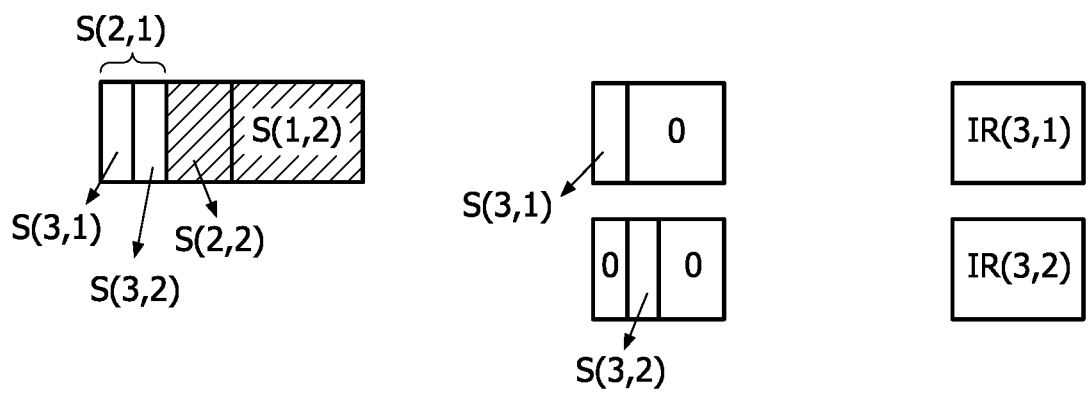

It is reasonable to assume the data segment not decoded correctly is S(2,1). In step S170, the data segment S(2,1) is further divided into two parts: S(3,1) and S(3,2). The data segments S(3,1) and S(3,2) are padded with known data and the data segments are expanded to be the predetermined lengthen in the step S180. Then in step S190, the expanded S(3,1) and S(3,2) are encoded respectively to obtain two data packets: parity-check information segment IR(3,1) and IR(3,2). The data-flow in step S170, S180 and S190 are illustrated in FIG. 2(c).

As linear block code is used in this scheme, the sum of parity-check information segments IR(3,1) and IR(3,2) respectively generated from S(3,1) and S(3,2) is equivalent to parity-check information packet IR(2,1) generated from S(2,1).

The data packets IR(3,1) and IR(3,2) are multiplexed in step S130 and transmitted in step S140. The process goes to S150 and will repeat S160, S170, S180, S190, S130, S140 and S150 until a feedback message with indication of "acknowledged" is received.

The above method for transmitting a source data block in a wireless communication system using hybrid automatic retransmission request protocol as provided in the invention can be implemented in software or hardware, or in combination of both.

Figure 3:
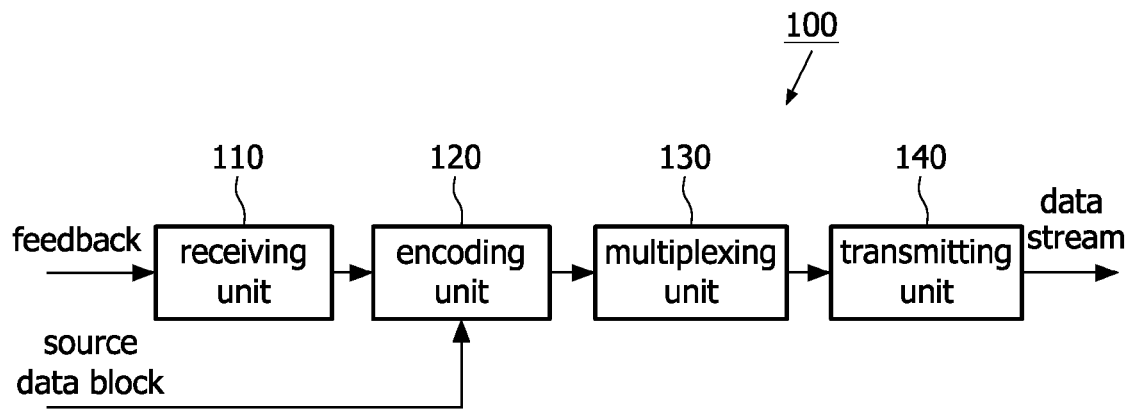
FIG. 3 is a block diagram illustrating an embodiment of a transmitting apparatus 100 in accordance with the invention.

FIG. 3 is a block diagram illustrating an embodiment of a transmitting apparatus 100 in accordance with the invention. The transmitting apparatus 100 comprises a receiving unit 110, an encoding unit 120 a multiplexing unit 130 and a transmitting unit 140.

The receiving unit 110 receives a feedback message from a corresponding receiver. The feedback message indicates which part of the source data block is not decoded correctly.

The encoding unit 120 generates at least two data packets for transmission based on the part of the source data block not decoded correctly. The implement of the encoding unit is described with details later.

The multiplexing unit 130 multiplexes the two encoded information segments output by the encoding unit 120 into a data stream to be transmitted. In a preferred embodiment, the data packets are random interleaved.

The transmitting unit 140 transmits the data stream to a transmission channel.

Figure 4:
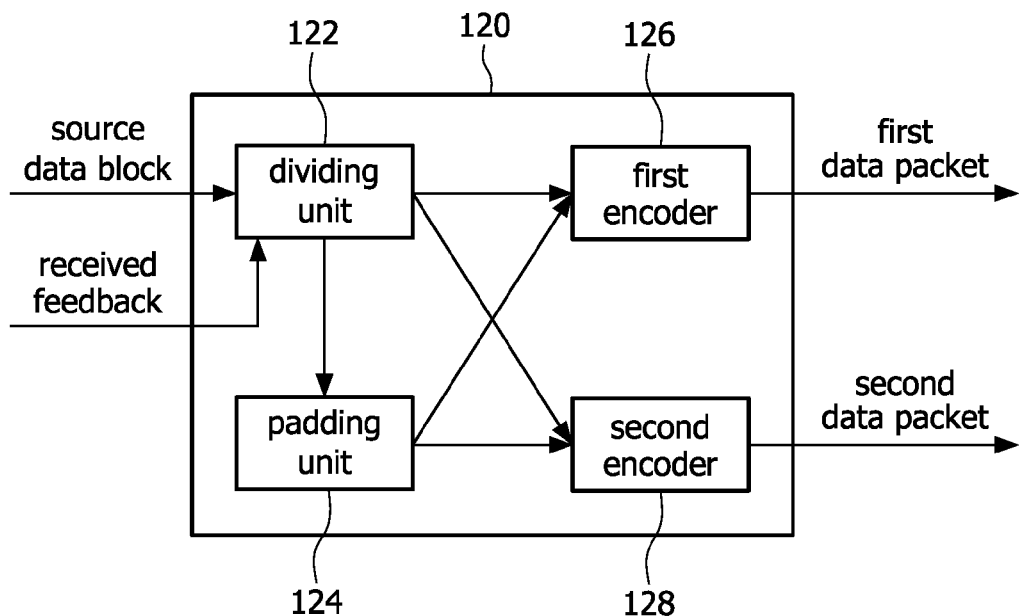
FIG. 4 is a block diagram illustrating an embodiment of an encoding unit 120 in transmitting apparatus 100 in accordance with the invention.

FIG. 4 is a block diagram illustrating an embodiment of an encoding unit 120 in transmitting apparatus 100 in accordance with the invention. The encoding unit 120 comprises a dividing unit 122, a padding unit 124, a first encoder 126 and a second encoder 128. The encoding unit 120 has two working statues: the first working status corresponds to initial transmission and the second corresponds to retransmission.

The dividing unit 122 has two inputs respectively coupled with the source data block and a feedback message from a corresponding receiver. The feedback message indicates which part of the source data block is not decoded correctly, otherwise, it indicates as "acknowledged" when all data segments for restoring the source data block are decoded correctly.

In first working status for initial transmission, the dividing unit 122 divides the source data block into two data segments and outputs the two data segments to the first and second encoder 126 and 128 directly for encoding. The first and second encoder 126 performs linear coding on each data segment and generates two data packets. Each of the two data packets includes a data segment used for encoding and a redundancy information segment. Referring back to FIG. 2(a) and corresponding description, the source data block S is divided into S(1,1) and S(1,2) in the dividing unit 122 and encoded to be first initial information segment S(1,1)+IR(1,1) and second information segment S(1,2)+IR(1,2) in the first and second encoder 126 and 128 respectively.

In second working status for retransmission, the dividing unit divides the part of source data block indicated as not decoded correctly into two data segments for retransmission, and output two data segments to the padding unit 124. The padding unit 124 pads known data into each data segment to expand the data segments to be predetermined lengthen. The expanded data segments are output to the first and second encoder 126 and 128 for encoding.

The first and second encoder 126 and 128 performs linear coding on each data segment and generates two data packets including redundancy information packets. Referring back to FIG. 2(b) and corresponding description, it is assumed that the data segment S(1,1) is not decoded correctly. S(1,1) is divided into S(2,1) and S(2,2) in dividing unit 122, padded with zeros in padding unit 124 and further encoded as IR(2,1) and IR(2,2) in the first and second encoder 126 and 128 respectively.

In a preferred embodiment, the first encoder 126 and second encoder 128 have same structure and function, and furthermore, the linear code and its code rate for encoding used in both encoders are same. Therefore, the two encoders can be implemented by same hardware.

In preferred embodiments for both working status, a low-density parity-check code as linear block code is used for channel coding because of its good performance as explained before.

FIG. 5 is a flowchart illustrating an embodiment of a receiving method in accordance with the invention. FIG. 6 is a schematic data flow illustrating an embodiment of the decoding scheme in accordance with the invention. The method has two phases corresponding to initial transmission phase and retransmission phase. It becomes more apparent from the following detailed description considered in connection with FIG. 5 and FIG. 6.

In step S210 of the process, an encoded data stream is received. The data stream comprises at least two data packets to be decoded.

In step S220, a working phase is determined according to the current receiving status. The process goes to step S224 during the first working phase and step S226 during the second working phase.

During the first working phase, each data packet in the received data stream includes a data segment and redundancy information segment. Corresponding to the initial transmission scheme illustrated in FIG. 1 and data flow illustrated FIG. 2(a), the first data packet includes data segment S'(1,1) and redundancy information segment IR'(1,1) and the second data packet includes data segment S'(1,2) and redundancy information segment IR'(1,2). The symbol [ ]' represents channel distortion of a received data segment or redundancy information segment. The redundancy information can be parity-check information or any other information for error correction.

Figure 6A:
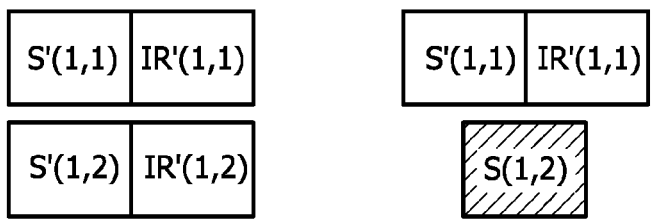
FIG. 6 is a schematic data flow illustrating an embodiment of the decoding scheme in accordance with the invention.
Figure 6B:
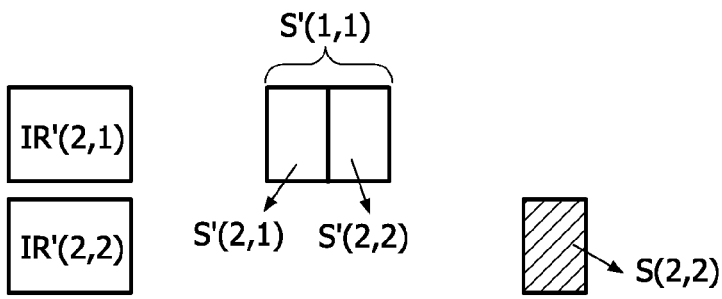

In step S224, decoding is performed on each data packet respectively to restore the source data segment S(1,1) and S(1,2). The decoding result and/or interim decoding result are buffered in step S240. Assuming that among the two data segments only S(1,1) is not decoded correctly. Then, the restored S(1,2) and interim decoding results for S(1,1), e.g. the reliability information of data segment S'(1,1) and parity bits IR'(1,1) are buffered for later use. The data-flow in step S210, S224 and S240 are illustrated in FIG. 6(b).

Here and hereafter, the interim decoding result is the reliability information related data segments for decoding and symbol [ ]' represents received segment or its corresponding reliability information, e.g., soft value or log-likelihood value for soft-decision decoding.

In step S250, a decision is made whether all data segments are decoded correctly or not. When at least a data segment is not decoded correctly, the process goes to step 252 and a feedback message with indication of which part of the source data block is not decoded correctly is sent to the corresponding transmitter. Otherwise, the process goes to step 254 and a feedback message with indication that all parts of the source data block are decoded correctly is sent to the corresponding transmitter.

In order to explain the invention clearly, it is reasonable to assume that at least a part of the source data block is not decoded correctly during the first working phase. The process enters the second working phase after sending a feedback message and the process goes to step S210.

During the second phase, two rounds of decoding are used to increase the probability of restoring the erroneous data segments. In step S210, an encoded data stream is received. The data stream includes two data packets and each includes a redundancy information segment. Referring to the transmission illustrated in FIG. 1 and FIG. 2(b), the corresponding redundancy information packets are IR'(2,1) and IR'(2,2).

In step S226, an data segment S'(1,1), which is indicated as not decoded correctly in previous feedback message, is extracted from the buffered data packet. The extracted data packet is divided into two data segments S'(2,1) and S'(2,2) in step S227 corresponding to the transmission scheme.

In step S228, decoding is performed, based on the two new data segments S'(2,1) and S'(2,2) and the received redundancy information segments IR'(2,1) and IR'(2,2) to restore the source data segments S(2,1) and S(2,2). The data-flow from S210 to S228 is illustrated in FIG. 6(b)

In step S230, a decision is made whether all data segments are decoded correctly or not. If the two data segments S(2,1) and S(2,2) are decoded correctly, the process goes to step S240 for buffering the restored data segments. Otherwise, the process goes to step S232 for a second chance of decoding. It is reasonable to assume data sub-segment S(2,2) is decoded correctly and S(2,1) is not decoded correctly during the first round decoding.

During the second round of decoding, in step S232 an redundancy information segment IR'(1,1) corresponding to the data segment S'(1,1) is extracted.

In step S234, the received redundancy information segment, IR'(2,1) and IR'(2,2) are composed into a linear redundancy information segment $IR^1(1,1)$. As linear coding is used, the linear redundancy information segment $IR^1(1,1)$ is equivalent to the redundancy information segment generated from source data segment S(1,1).

In step S236, an optimized redundancy information $IR^o$ (1,1) is generated based on the two redundancy information segments IR'(1,1) and $IR^1(1,1)$.

In a preferred embodiment, the optimization is based on the reliability information of the parity bits obtained from the previous decoding processes. For each bit of $IR^o$ (1,1), the selection priority is given to the corresponding reliability information bit in IR'(1,1) or $IR^1(1,1)$ so that the selected bit has higher probability of being close to "0" or "1".

The selected bit may be the one whose value is outside of a predefined range (a,b). The value of a and b could be determined by simulation or theoretical deduction, referring to the method provided by Fossorier, M. P. C., Shu Lin, "Soft-decision decoding of linear block codes based on ordered statistics," Information Theory, IEEE Transactions on Volume 41, Issue 5, September 1995 Page(s): 1379-1396.

Take (a,b)=(−1,1) as an example, where reliability value much greater than 1 means its corresponding bit value is sure to be '1', while reliability value much less than −1 means its corresponding bit value is sure to be '−1'.

If both IR'(1,1) and $IR^1(1,1)$ are outside of the range with the same sign, for example, IR'(1,1)=−2 and $IR^1(1,1)$=−2.5, we could see that $|IR^1(1,1)|>|IR'(1,1)|>1$, then priority gives to $IR^1(1,1)$ and the reliability information assures us that this corresponding bit value is '−1'.

If both of the two corresponding bits from $IR^1(1,1)$ or $IR^1(1,1)$ are outside of the range, then the bit can be selected based on following rule:

When both IR'(1,1) and $IR^1(1,1)$ are outside of the range with opposite sign, for example, IR'(1,1)=−2 and $IR^1(1,1)$=2.5, e.g., $|IR^1(1,1)|>|IR'(1,1)|>1$, then priority gives to $IR^1$(1,1) and the reliability information assures us that this corresponding bit value is '1'.

When one of the reliability information is outside of the range and the other is within the range, for example, IR'(1,1)=−2 and $IR^1(1,1)$=0.2, then priority gives to the one that is outside of the range, i.e., IR'(1,1) and the reliability information assures us that this corresponding bit value is '−1'.

The bits in IR'(1,1) are compared with corresponding bits in $IR^1$(1,1 bit by bit until an optimized redundancy information segment $IR^o$ (1,1) is selected with higher reliability.

In step S238, the second round decoding is performed to restore the data segment S(1,1), based on the interim data segment S'(1,1) and the optimized redundancy information segment $IR^o$ (1,1)

Figure 6C:
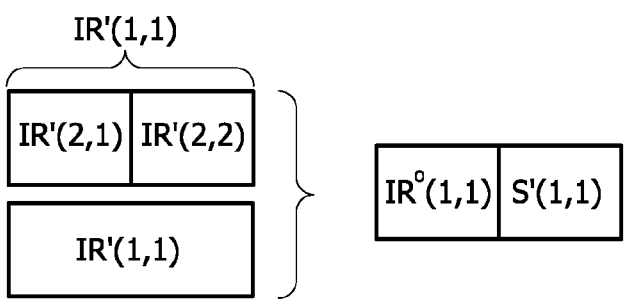

In step S240, the restored data segment S(1,1) is buffered if the second round of decoding succeeds, otherwise, the interim decoding results of the first round decoding are buffered, e.g., the restored data segment S(2,2) and the redundancy information segment IR'(2,1) is buffer for later decoding. The data-flow from step S232 to S240 is illustrated in FIG. 6(c).

In step S250, a decision is made based on the content of the feedback message with similarity of the one described for the first working phase. Assuming S(2,1) is not decoded correctly yet, a feedback message with indication of the data segment as not decoded correctly is sent to the transmitter in step S252. And the process goes to step S210 and repeats the steps as similar way described above. In the case corresponding to the transmission scheme illustrated in FIG. 2(c), the redundancy information segment IR'(3,1) and IR'(3,2) are further received. An data segment S'(2,1) is extracted from buffered data packet and further divided into data segments S'(3,1) and S'(3,2). The first round decoding is performed based on the data segment and redundancy information segment S'(3,1)+IR'(3,1) and S'(3,2)+IR'(3,2) respectively.

Figure 6D:
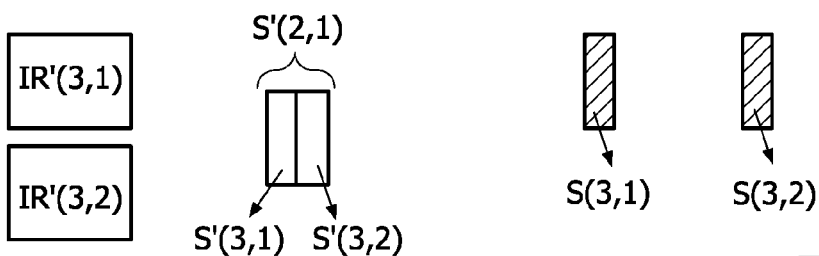

If the two data segment are decoded correctly, then the restored data segments S(3,1) and S(3,2) are buffered. The corresponding data-flow is illustrated in FIG. 6(d). After buffering the restored data segments, the process goes to step S254 and a feedback message is sent to the transmitter with indication as "acknowledged".

Figure 6E:
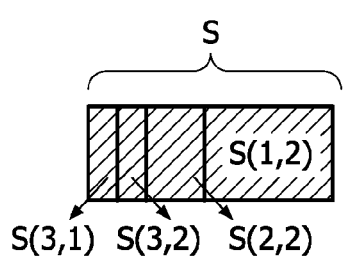

In step S256, the buffered source data segments are composed to be the source data block. In above example, the buffered data segments S(1,2), S(2,2), S(3,1) and S(3,2) are composed to be source data block S as illustrated in FIG. 6(e).

The above method for transmitting a source data block in a wireless communication system using hybrid automatic retransmission request protocol as provided in the invention can be implemented in software or hardware, or in combination of both.

Figure 7:
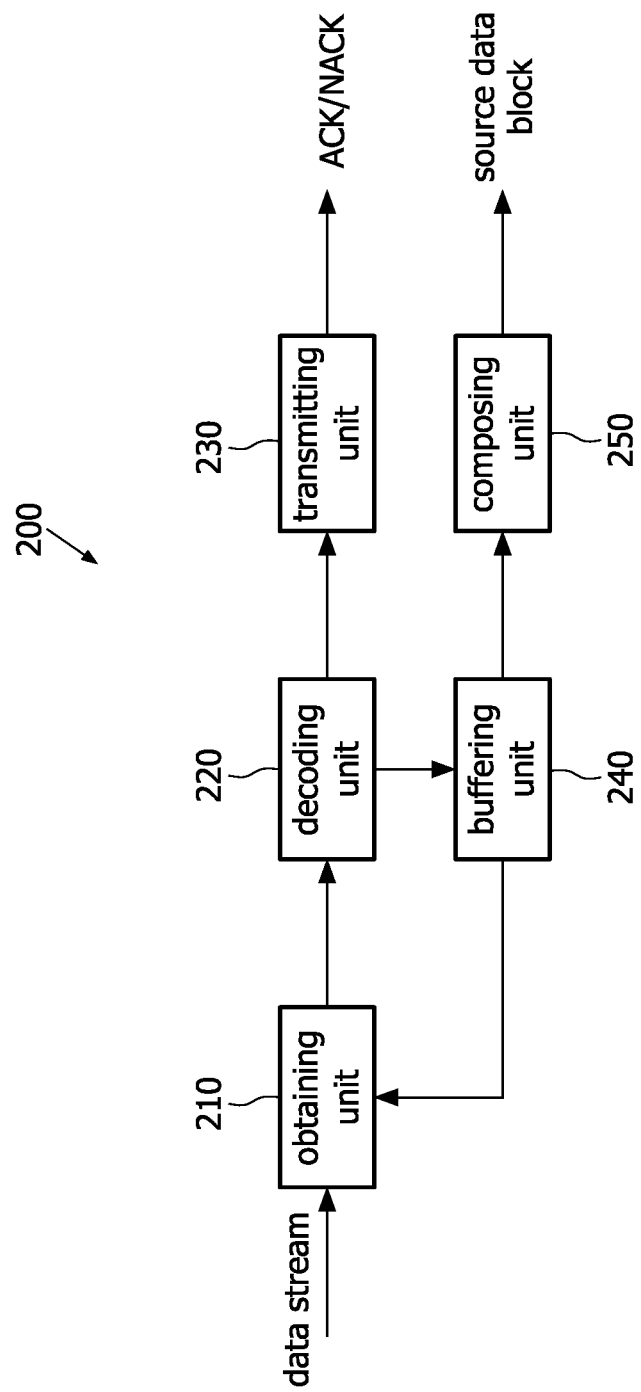
FIG. 7 is a block diagram illustrating an embodiment of a receiving apparatus 200 in accordance with the invention.
Figure 8:
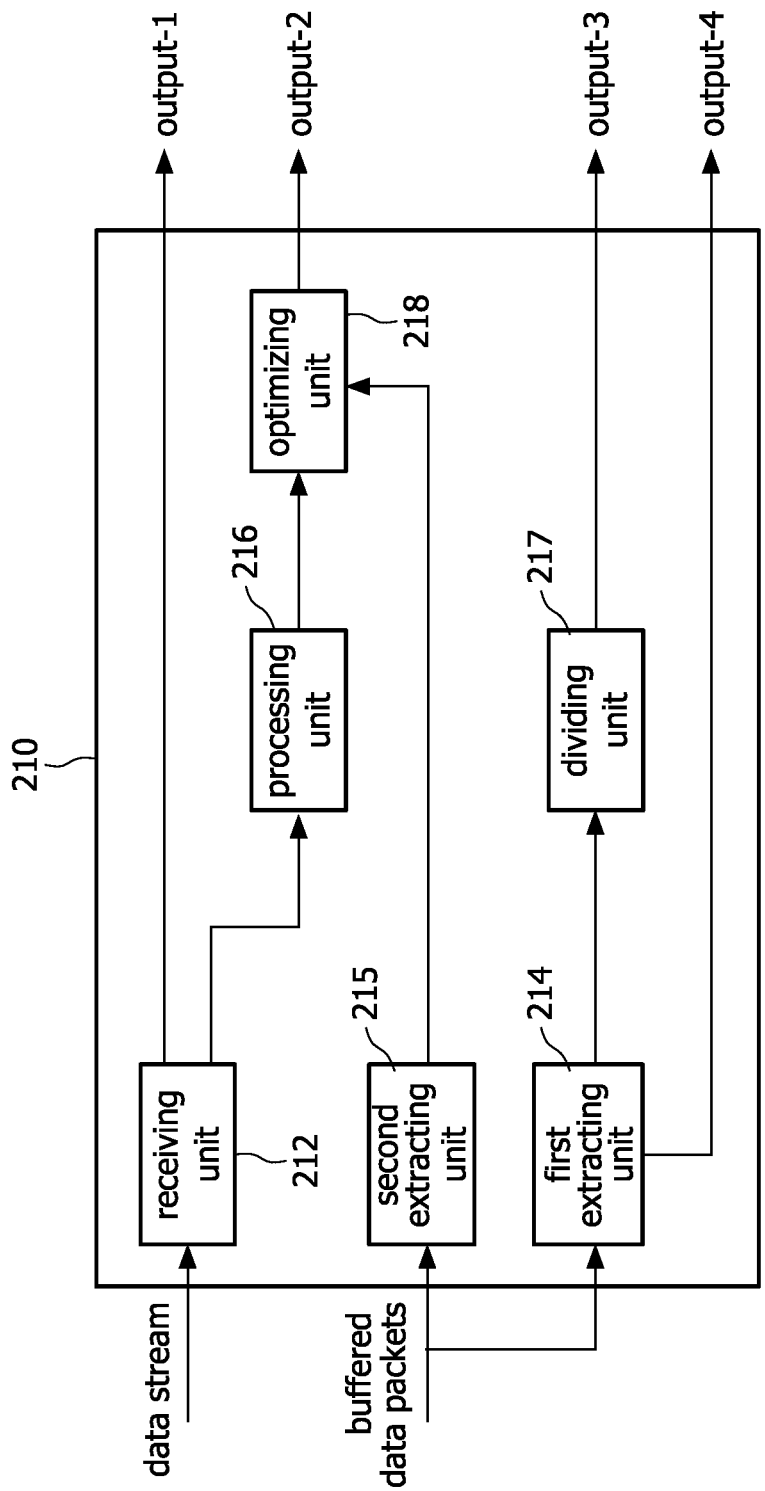
FIG. 8 is a block diagram illustrating an embodiment of an obtaining unit 210 in receiving apparatus 200 in accordance with the invention.

FIG. 7 is a block diagram illustrating an embodiment of a receiving apparatus 200 in accordance with the invention. FIG. 8 is a block diagram illustrating an embodiment of an obtaining unit 210 in receiving apparatus 200 in accordance with the invention. The receiving apparatus comprises an obtaining unit 210, a decoding unit 220, a transmitting unit 230, a buffering unit 240, and a composing unit 250.

The obtaining unit 210 has a first input coupled with the data stream from a transmission channel, a second input coupled with the buffering unit 240 and an output coupled with a decoding unit 220 having a plurality of decoders. The obtaining unit 210 is arranged to obtain a plurality of data segments and corresponding redundancy information segments for decoding from the transmission channel and/or the buffer unit 240. The obtaining unit 210 has two working phases corresponding to initial transmission and retransmission respectively. Referring back to FIG. 6(a) to FIG. 6(d), the output of the obtaining unit 210 changes during different working phases, which will be explained in detail later.

The decoding unit 220 including a plurality of decoders arranged to decode the data segment based on each pair of data segment and redundancy information segment output from the obtaining unit 210. As encoding scheme including the linear code and code rate used for encoding are same for obtaining data packet for initial transmission or retransmission, for data segment and redundancy information segment received in different phase, the plurality of decoders may have same structure and can work on same code rate, and thus restore the data segments without the need modification of hardware.

The transmitting unit 230 sends feedback message to corresponding transmitter according to decoding result. It sends a feedback message with indication as "acknowledged" when all data segments for restoring the source data block are decoded correctly, and sends a feedback message with indication of which part of the source data block is not decidedly correctly when at least a data segment is not decoded correctly.

The buffering unit 240 buffers the restored data segments when they are decoded, buffers the interim decoding result, e.g., the reliability information of data segment and the redundancy information segment when the data segment is not decoded correctly, for later decoding.

The composing unit 250 composes the source data block based on the buffered source data segments.

FIG. 8 is a block diagram illustrating an embodiment of an obtaining unit 210 in receiving apparatus 200 in accordance with the invention. The obtaining unit 210 comprises a receiving unit 212, a first and second extracting unit 214 and 215, a processing unit 216, a dividing unit 217 and an optimizing unit 218. The obtaining unit 210 has two working phases corresponding to initial transmission phase and retransmission phase respectively.

During the first working phase corresponding to initial transmission, each data packet received by the receiving unit 212 includes a data segment and redundancy information segment that can be output directly to decoding unit 220 as Output 1. Referring to FIG. 6 (*a*), the Output 1 is S'(1,1)+IR'(1,1) and S'(1,2)+IR'(1,2). Accordingly, the decoding unit 220 takes S'(1,1)+IR'(1,1) and S'(1,2)+IR'(1,2) as input and performs decoding to restore source data segment S(1,2) and S(1,2). If one of the data segments is not decoded correctly, the receiving unit 212 will receive a further data stream from a transmission channel and the decoding unit enters the second working phase, which corresponds to the phase of retransmission.

During the second working phase, each data packet in the data stream includes only redundancy information segment, for example, IR'(2,1) and IR'(2,2), e.g., Output 1. For first round decoding, the first extracting unit 214 extracts a data segment not decodedly correctly from a buffered data packet. For example, if S(1,1) is not decoded correctly, the received data segment S'(1,1) from initial transmission is extracted. The dividing unit 217 divides the extracted data segment S'(1,1) into two data segment S'(2,1) and S'(2,2) corresponding the retransmission scheme and outputs them as Output 3. Accordingly, the decoding unit takes S'(2,1)+IR'(2,1) and S'(2,2)+IR'(2,2) as input and performing decoding to restore S(2,1) and S(2,2).

When at least one of the data sub-segments is not decoded correctly, a second round of decoding scheme is taken for an additional chance to restore the extracted data segment. In such situation, the second extracting unit 215 extracts a buffered redundancy information segment IR'(1,1) from the buffering unit 240. The redundancy information segment corresponds to the extracted data segment.

And meanwhile, the processing unit 216 composes a linear redundancy information segment $IR^1(1,1)$ based on the received redundancy information segments IR'(2,1) and IR'(2,2), and then the optimizing unit 218 generates an optimal redundancy information segment $IR^o$ (1,1) based on $IR^1(1,1)$ and IR'(1,1) according to the method described before. Accordingly, the decoding unit 220 takes optimal redundancy information segment $IR^o$ (1,1) (Output 2) and the data segment from the first extracting unit 214 (Output 3) as inputs and performs decoding to restore the source data segment S(1,1).

The second working phase repeats until all parts of the source data block are restored. The corresponding restored data segments such as S(1,2), S(2,2), S(3,1) and S(3,2) are buffered in buffering unit 240 and composed to be the source data block in the composing unit 250.

The embodiments of the present invention described herein are intended to be taken in an illustrative and not a limiting sense. Various modifications may be made to these embodiments by those skilled in the art without departing from the scope of the present invention as defined in the appended claims.

The invention claimed is:

1. A method of transmitting a source data block to a receiver in a wireless communication system using hybrid automatic retransmission request protocol, comprising:
   dividing the source data block into a plurality of data segments;
   performing linear coding on each of the plurality of data segments to generate a plurality of data packets, each of the plurality of data packets including the data segment used for encoding and a corresponding redundancy information segment for decoding in the receiver;
   transmitting the plurality of data packets to a transmission channel;
   receiving a feedback message from the receiver, the feedback message indicating which part of the source data block is not decoded correctly;
   dividing the indicated part of the source data block into the plurality of data segments;
   padding known data into each of the plurality of data segments to expand the data segment to be a predefined length;
   performing linear coding on each of the plurality of data segments to generate the plurality of data packets, each of the plurality of data packets including only the redundancy information segment for decoding the data segment in the receiver; and
   transmitting the plurality of data packets to the transmission channel.

2. A method as claimed in claim 1, further comprising multiplexing the plurality of data packets into a data stream for transmission.

3. A method as claimed in claim 1, wherein the linear code and code rate used for encoding are same.

4. A method as claimed in claim 3, wherein a low-density parity-check code as linear block code is used for channel coding.

5. An apparatus for transmitting a source data block to a receiver in a wireless communication system using hybrid automatic retransmission request protocol, comprising:
   a dividing unit for dividing the source data block into a plurality of data segments;
   a plurality of encoders for performing linear coding on each of the plurality of data segments to generate a plurality of data packets, each of the plurality of data packets including the data segment used for encoding and a corresponding redundancy information segment for decoding in the receiver;
   a transmitting unit for transmitting the plurality of data packets to the transmission channel;
   a receiving unit for receiving a feedback message from the receiver, the feedback message indicating which part of the source data block is not decoded correctly;
   wherein the dividing unit is further arranged for dividing the indicated part of the source data block into the plurality of data segments;
   a padding unit for padding known data into each of the plurality of data segments to expand the data segment to be a predefined length;
   wherein the plurality of encoders is further arranged for performing linear coding on each of the plurality of data segments to generate the plurality of data packets, each of the plurality of data packets including only a redundancy information segment for decoding the data segment in the receiver; and wherein the transmitting unit is further arranged for transmitting the plurality of data packets to the transmission channel.

6. An apparatus as claimed in claim 5, wherein the structure and function of the plurality of encoders are same; and the linear code and code rate used for encoding are same.

7. An apparatus as claimed in claim 5, wherein a low-density parity-check code as linear block code is used for channel coding.

8. An apparatus as claimed in claim 5, further comprising a multiplexing unit for multiplexing the plurality of data packets into a data stream for transmission.

9. A receiving method for restoring a source data block in a wireless communication system using hybrid automatic retransmission request protocol, comprising:
   (a) receiving a data stream from a transmission channel, the data stream including a plurality of data packets, each of the data packets including only a redundancy information segment;
   (b) extracting a data segment not decoded correctly from a buffered data segment;
   (c) dividing the extracted data segment into a plurality of data segments; and
   (d) performing channel decoding based on each of the plurality of data segments and corresponding redundancy information segment respectively to restore a plurality of source data segments.

10. A method as claimed in claim 9 further comprising before (a):
   receiving a plurality of data packets, each of the plurality of data packets including a data segment and a redundancy information segment; and
   performing channel decoding based on the data segment and redundancy information segment in each of the plurality of data packets to restore a source data segment.

11. A method as claimed in claim 10, further comprising:
   buffering the restored source data segment and the data segment not decoded correctly and corresponding redundancy information segment thereof;
   sending a feedback message to a transmitter, the feedback message indicating which part of the source data block is not decoded correctly when at least a data segment is not decoded correctly; and
   composing the source data block based on the buffered data segments.

12. A method as claimed in claim 9, when any one of the plurality of data segments is not decoded correctly during the retransmission after (d), further comprising:
   composing the plurality of redundancy information segments to be a linear redundancy information segment;
   extracting an redundancy information segment from a buffered redundancy information segment corresponding to the data segment extracted in (b);
   generating an optimized redundancy information segment based on the linear redundancy information segment and the extracted redundancy information segment; and performing channel decoding based on the optimized redundancy information segment and the extracted data segment to restore a source data segment.

13. A receiving apparatus for restoring a source data block in a wireless communication system using hybrid automatic retransmission request protocol, comprising:
   a receiving unit for receiving a data stream from a transmission channel, the data stream including a plurality of data packets, each of the data packets including only a redundancy information segment;
   a first extracting unit for extracting a data segment not decoded correctly from a buffered data segment;
   a dividing unit for dividing the extracted data segment into a plurality of data segments; and
   a plurality of decoders for performing channel decoding based on each of the plurality of data segments and corresponding redundancy information segment respectively to restore a plurality of source data segments.

14. An apparatus as claimed in claim 13, wherein the receiving unit if further arranged for receiving a plurality of data packets, each of the plurality of data packets including a data segment and a redundancy information segment; the plurality of decoders is further arranged for performing channel decoding based on the data segment and redundancy information segment in each of the plurality of data packets to restore a source data segment.

15. An apparatus as claimed in 14, further comprising:
   a buffering unit for buffering the restored source data segment and the data segment not decoded correctly and corresponding redundancy information segment thereof;
   a transmitting unit for sending a feedback message to a transmitter, the feedback message indicating which part of the source data block is not decoded correctly when at least a data segment is not decoded correctly; and
   a composing unit for composing the source data block based on the buffered data segments.

16. An apparatus as claimed in claim 13, further comprising:
   a second extracting unit for extracting an redundancy information segment from a buffered redundancy information segment corresponding to the data segment extracted by the first extracting unit;
   a processing unit for composing the plurality of redundancy information segments to be a linear redundancy information segment; and
   a generating unit for generating an optimized redundancy information segment based on the linear redundancy information segment and the extracted redundancy information segment.

17. An apparatus as claimed in claim 16, wherein, the plurality of decoders are further arranged for performing channel decoding based on the optimized redundancy information segment and the extracted data segment to restore a source data segment.

* * * * *